(12) United States Patent
Fang et al.

(10) Patent No.: US 9,251,151 B1
(45) Date of Patent: Feb. 2, 2016

(54) SYSTEM AND METHOD FOR MERGING CONTINUOUS VOLUME SNAPSHOTS

(71) Applicant: CA, Inc., Islandia, NY (US)

(72) Inventors: Austin Fang, Beijing (CN); Zhe He, Beijing (CN); Lei Li, Beijing (CN); Taiwen Zhang, Beijing (CN)

(73) Assignee: CA, Inc., Islandia, NY (US)

( * ) Notice: Subject to any disclaimer, the term of this patent is extended or adjusted under 35 U.S.C. 154(b) by 391 days.

(21) Appl. No.: 13/933,531

(22) Filed: Jul. 2, 2013

(51) Int. Cl.
*G06F 17/30* (2006.01)

(52) U.S. Cl.
CPC .................................. *G06F 17/3007* (2013.01)

(58) Field of Classification Search
CPC ................................................ G06F 17/30088
USPC .................................. 707/645, 646, 647, 648
See application file for complete search history.

(56) References Cited

U.S. PATENT DOCUMENTS

| | | | | |
|---|---|---|---|---|
| 6,385,626 B1 * | 5/2002 | Tamer | ................. | G06F 11/1451 |
| 6,564,219 B1 * | 5/2003 | Lee | ................... | G06F 17/30557 707/769 |
| 6,697,804 B1 * | 2/2004 | Elsbernd | ........... | G06F 17/30575 |
| 7,320,058 B2 * | 1/2008 | Fujibayashi | .......... | G06F 3/0607 707/999.202 |
| 8,285,682 B2 * | 10/2012 | Oza | ........................ | G06F 9/542 707/646 |
| 2008/0228784 A1 * | 9/2008 | Dempsey | ............ | G06F 9/30021 |
| 2011/0161299 A1 * | 6/2011 | Prahlad | ............. | G06F 17/30091 707/649 |

* cited by examiner

*Primary Examiner* — Syed Hasan
*Assistant Examiner* — Ahmed Abraham
(74) *Attorney, Agent, or Firm* — Gilliam IP PLLC

(57) ABSTRACT

A system divides a source computer storage device into a plurality of logical volumes, and creates a first recovery point data file and a first recovery point index file. In response to an incremental backup of a first logical volume, the system creates a second recovery point index file comprising a plurality of indices. In response to no data changing in a particular block in the first logical volume, the system points an index in the second recovery point index file to the particular block in the first logical volume. In response to data changing in the particular block in the first logical volume, the system creates a corresponding new block in a second recovery point data file. The system points the index in the second recovery point index file to the corresponding new block in the first logical volume.

14 Claims, 12 Drawing Sheets

SYSTEM AND METHOD FOR MERGING CONTINUOUS VOLUME SNAPSHOTS

TECHNICAL FIELD

The current disclosure relates to a system and method for merging continuous volume snapshots in a computer system.

BACKGROUND

In current data maintenance and backup procedures, incremental backups are used quite extensively in disk-to-disk backups. In an incremental backup, after an initial full backup, the backup application will only backup data that has been changed. The backup application stores information about source data as metadata in a database, and the backup application is intelligent enough to reconstruct a file to a point in time, based on information about the changed data that it records.

SUMMARY

Embodiments of the present disclosure include computer systems, computer processes, and computer processes embodied on computer readable media.

In an embodiment, a system is configured to execute an incremental backup. The system first divides a source computer storage device into a plurality of logical volumes. The system then creates a first recovery point data file and a first recovery point index file. The first recovery point data file includes a plurality of blocks that are associated with a first logical volume, and the first recovery point index file includes a plurality of indices. Each of the plurality of indices points to a particular block in the first recovery point data file in the first logical volume. In response to an initiation of an incremental backup of the first logical volume, the system creates a second recovery point index file in the first logical volume that includes a plurality of indices. Each of the plurality of indices in the second recovery point index file in the first logical volume corresponds to an index in the first recovery point index file in the first logical volume.

In response to no data changing in a particular block in the first logical volume at the initiation of the incremental backup of the first logical volume, the system points an index in the second recovery point index file in the first logical volume to the particular block in the first logical volume. In response to data changing in the particular block in the first logical volume at the initiation of the incremental backup of the first logical volume, the system creates a corresponding new block in a second recovery point data file. The corresponding new block in the second recovery point data file is associated with the first logical volume. The system points the index in the second recovery point index file to the corresponding new block in the first logical volume.

DETAILED DESCRIPTION

Figure 1:
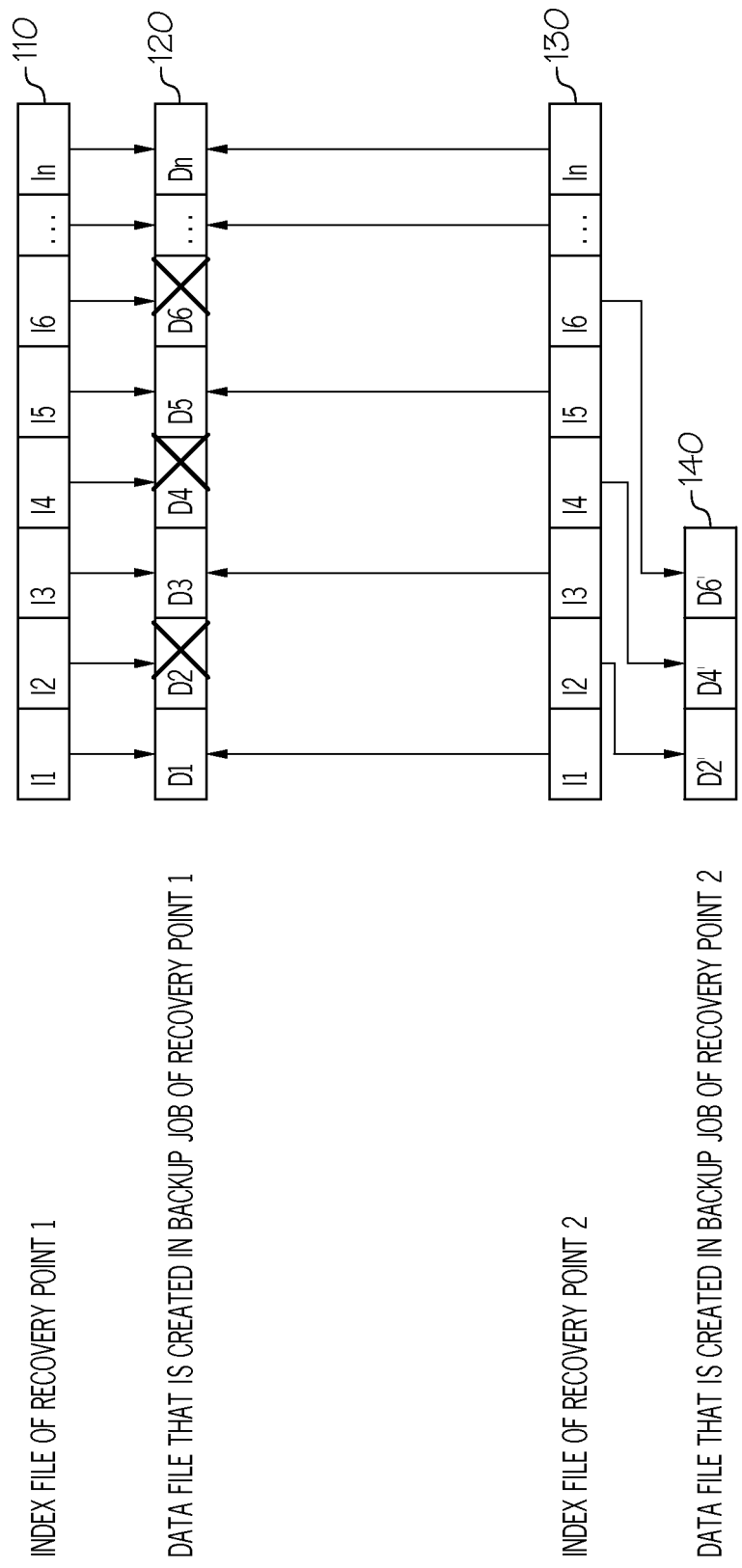
FIG. 1 is a block diagram illustrating recovery point index files and recovery point data files.

In the following detailed description, reference is made to the accompanying drawings that show, by way of illustration, specific embodiments that may be practiced. These embodiments are described in sufficient detail to enable those skilled in the art to practice these embodiments. It is to be understood that the various embodiments, although different, are not necessarily mutually exclusive. For example, a particular feature, structure, or characteristic described herein in connection with one embodiment may be implemented within other embodiments without departing from the scope of the present disclosure. In addition, it is to be understood that the location or arrangement of individual elements within each disclosed embodiment may be modified without departing from the scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

For incremental backups, a user generally sets a specific number of recovery points to maintain or retain. For example, if the user chooses to retain three valid recovery points, then after the fourth recovery point is backed up, recovery point 1 is removed. After the removal of recovery point 1, the valid recovery points are 2, 3 and 4. However, it is possible that some data in the data file of recovery point 1 may still be referred to by other valid recovery points. Consequently, one cannot haphazardly delete the data file of recovery point 1. Rather, a merge must be executed. A merge handles the data files of recovery point 1 and recovery point 2 so that obsolete data blocks are deleted to free up disk space, while still permitting recovery point 2 to locate and access all valid data blocks.

For example, referring to FIG. 1, in recovery point 2, blocks 2, 4, and 6 (D2, D4, D6) have changed since the creation of recovery point 1. After recovery point 1 expires, the recovery point 1 index 110 is deleted, but the recovery point 1 data file 120 has to be handled. However, the recovery point 1 data file 120 cannot simply be deleted. The following are some possible ways to handle the recovery point 1 data file 120, each of which has its advantages and disadvantages.

A first way to handle the recovery point 1 data file 120 is to simply do nothing with the recovery point 1 data file 120. That is, just keep the recovery point 1 data file 120 as is. An advantage of such a technique is that a merge is very quick since it actually doesn't handle the recovery point 1 data file 120. Moreover, a recovery point 2 index file 130 does not have to be modified because the offset information of all data blocks has not changed. A disadvantage to this method is that the obsolete data blocks (D2, D4, D6) remain on the disk, and the storage area occupied on the disk will keep increasing with the creation of more and more recovery points.

A second way to handle the recovery point 1 data file 120 is to leverage a sparse mode in order to zero out the obsolete data blocks (D2, D4, D6) in the recovery point 1 data file 120. An advantage of this technique is that a merge is very quick. The merge is very quick since zeroing out blocks in a sparse file is extremely quick. The zeroing out of the blocks is extremely quick because it also doesn't need to modify the recovery point 2 index file 130 since the offset information of all data blocks is not changed. A disadvantage of this technique is that it causes severe disk fragmentation, and it will eventually impact read/write throughput on the disk. Additionally, Microsoft has limitations on zeroing out blocks in a spare file. If the block to zero out is not 64 KB aligned, it might not free all space of the specific block. Rather, it may just free a portion of the 64 KB block.

A third way to handle the recovery point 1 data file 120 is to move D2', D4', D6' in the recovery point 2 data file 140 into the recovery point 1 data file 120. That is, overwrite the obsolete data blocks D2, D4 and D6 in the recovery point 1 data file 120. After the overwrite, the recovery point 2 data file 130 is deleted and the recovery point 1 data file 120 is renamed as the recovery point 2 data file. An advantage of this technique is that it could effectively free disk space (i.e., the obsolete data blocks could be reused). A disadvantage is that the merge is slow since it has to do many disk seek operations to fill the data holes. Additionally, it may not work if compression is enabled, since in such a situation the size of D2' may be greater than the size of D2.

A fourth way to handle the recovery point 1 data file 120 is to separately read out valid data blocks from the recovery point 1 data file 120 and the recovery point 2 data file 140. That is, read out D1, D3, D5, . . . , Dn from the recovery point 1 data file 120, read out D2', D4', D6' from the recovery point 2 data file 140, and consolidate these valid data blocks into one new file. Thereafter, delete the recovery point 1 data file 120 and the recovery point 2 data file 140, and rename the new file as the recovery point 2 data file. An advantage of this technique is that it could effectively free disk space. A disadvantage is that the merge is slow since it has to read out all valid data blocks of a whole source volume, and then write them back in one new file. Generally, the size of obsolete data blocks is a small percentage of the size of the entire data volume. This means much data has to be read and written in order to free the disk space in single merge job.

Notwithstanding the aforementioned ways or other ways to merge recovery points, an embodiment disclosed herein merges recovery points that effectively frees disk space, avoids disk fragmentation, and produces an extremely quick merge throughput. The embodiment involves a complete system that can quickly merge recovery points. It includes two major parts. First, during a backup job, it divides a source volume into multiple segments and then accordingly generates data files based on the segments. This storage layout is the basics of quick merging. Second, the merge job is performed based on the segments. Different data processing steps are used according to the data change status of each segment.

Figure 2:
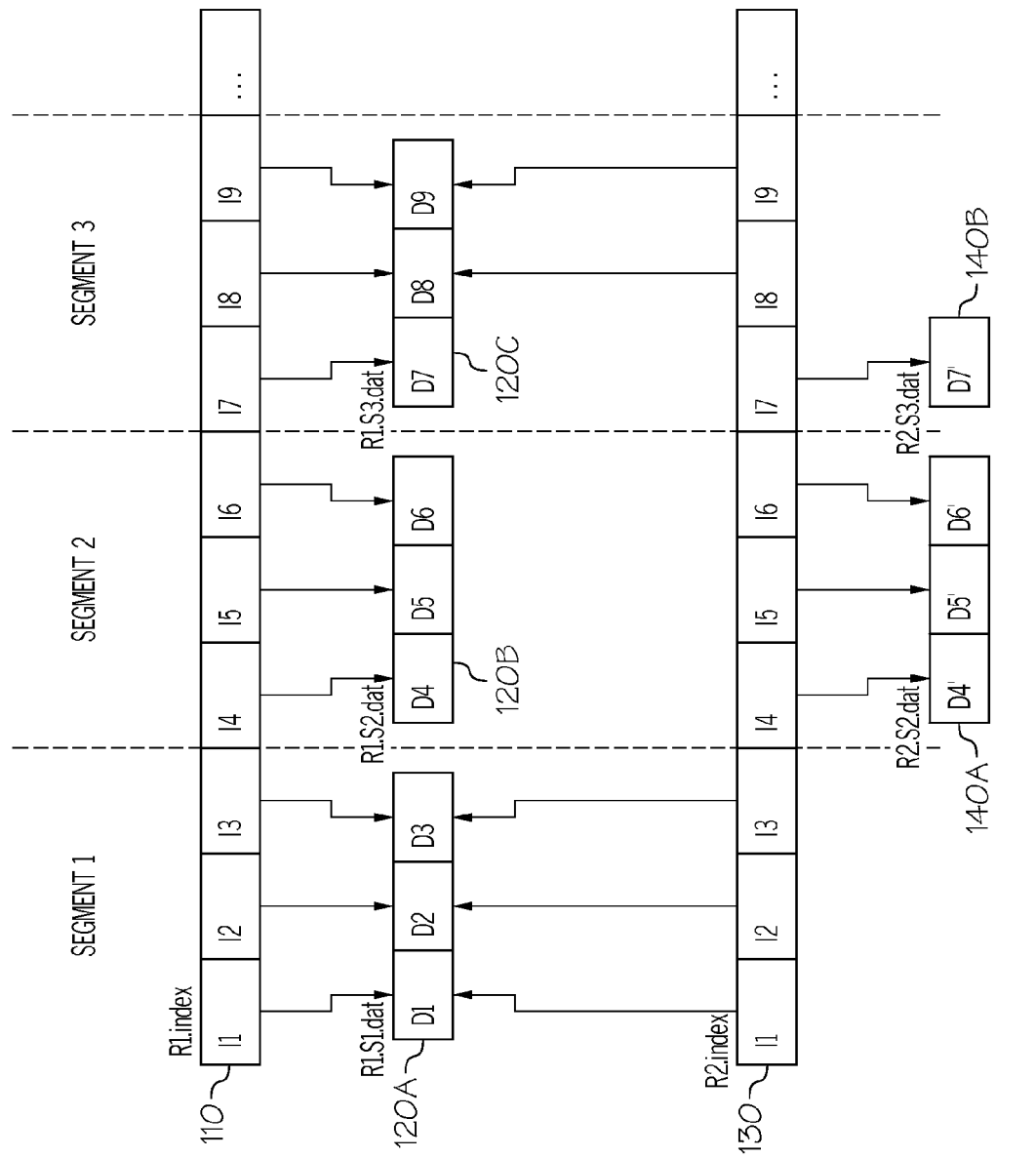
FIG. 2 is a block diagram illustrating a division of a source volume into segments and associated index and data files.

FIG. 2 illustrates the manner in which a source volume is divided up into multiple segments, and further how the recovery point index files and recovery point data files fall within those segments. In FIG. 2, R1 refers to recovery point 1, S1 refers to segment 1, R1.index (110) is the index file for recovery point 1, and R1.S1.dat (120A) is the data file of the first segment for recovery point 1. When the source volume is segmented during the backup job, every segment has one independent data file if that segment has valid data in the specific recovery point. For example, in FIG. 2, segment 1 has data file R1.S1.dat (120A), which has data blocks D1, D2, and D3. Of further note is that a recovery point only has one index file. In FIG. 2, recovery point 1 has one index file R1.index (110). A recovery point can have a single segment data file or multiple segment data files. Recovery point 1 in FIG. 2 has multiple segment data files—120A (D1, D2, D3), 120B (D4, D5, D6), and 120C (D7, D8, D9). If a segment has new or changed data at backup time of the recovery point, a corresponding new segment data file is created. Otherwise, a new segment data file is not created. Entries in a recovery point index file may point to multiple segment data files. For example, in FIG. 2, indices I1, I2, and I3 point to segment data file 120A, indices I4, I5, and I6 point to segment data file 120B, and indices I7, I8, and I9 point to segment data file 120C. FIG. 2 further illustrates a second recovery point and its associated second recovery point index file R2.index (130) and recovery point data files R2.S2.dat (140A) for segment 2 and R2.S3.data (140B) for segment 3.

Some other points about FIG. 2 are as follows. The recovery point 1 index file 110 describes where to find its data blocks for recovery point 1. The recovery point 2 index file 130 describes where to find its data blocks for recovery point 2. Recovery point 1 index file 110 and recovery point 2 index file 130 both describe the same logical volume (segment). Of course, if a data block on the segment is not changed, the corresponding entry in both recovery point 1 index file 110 and recovery point 2 index file 130 point to the same offset of the same data file (FIG. 2, Segment 1). However, recovery point 1 index file 110 and recovery point 2 index file 130 have no dependency relationship.

Also, a recovery point is one restorable snapshot for a source volume. So, when a system generates a new recovery point, no data or index files of the earlier recovery points are deleted. If this was not the case, the earlier recovery points would not be restorable. Also, data blocks in a data file never change. What is changing is the data on one logical volume (i.e., a segment). The incremental backup reads out the changed data from logical volume and then writes the data to the data file of a newly generated recovery point.

When an incremental backup generates recovery point 2, the incremental backup doesn't necessarily generate a new recovery point 2 data file for logical volume 1. The index file of the logical volume in recovery point 2 could possibly point to the data blocks in the data file of the first recovery point (because the data are not changed on the logical volume). So, as noted above, data blocks in one data file are not changed. Rather, what is changed are the data on one logical volume (segment). The incremental backup reads out the changed data from the logical volume then writes the data to the data file of newly generated recovery point.

When recovery point 1 expires, a merge job is executed to merge recovery point 1 and recovery point 2. After the merge, recovery point 1 is no longer valid. Then, when recovery point 2 expires, a merge job is executed to merge recovery point 2 and recovery point 3. After that merge, recovery point 2 is no longer valid. The timing of these merge jobs is based on the retention setting of the recovery points (e.g., a system is configured to retain three recovery points at a time). Once a recovery point expires, it triggers the execution of a merge job.

Figure 3:
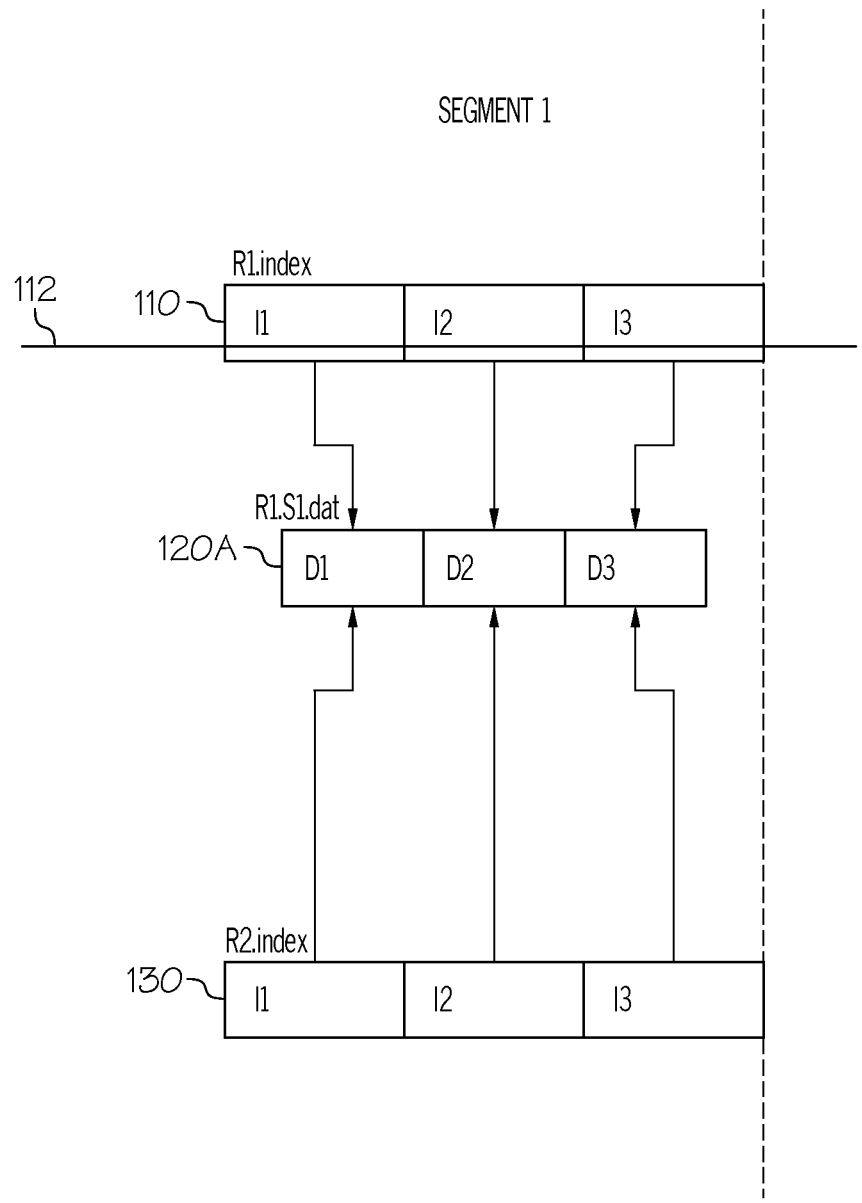
FIG. 3 is a block diagram illustrating a first data change type of a particular segment of a source volume and its associated index and data files.

As noted, merge jobs are based on segments. Segments can be classified as one of three types based on the data change status of the segment, and subsequent processing depends on the different types of data change segments. FIG. 3 illustrates a first data change type. In this first data change type, there is no new or changed data in the segment. All data in the data segment file 120A of the previous recovery point 110 is valid. That is, recovery point 1 data file 120A has no obsolete data blocks. To merge this segment 1, the recovery point index file 110 is simply deleted as indicated by line 112, and the corresponding indices in the recovery point 2 index file 130 point to the data blocks in the recovery point 1 data file 120A.

Figure 4:
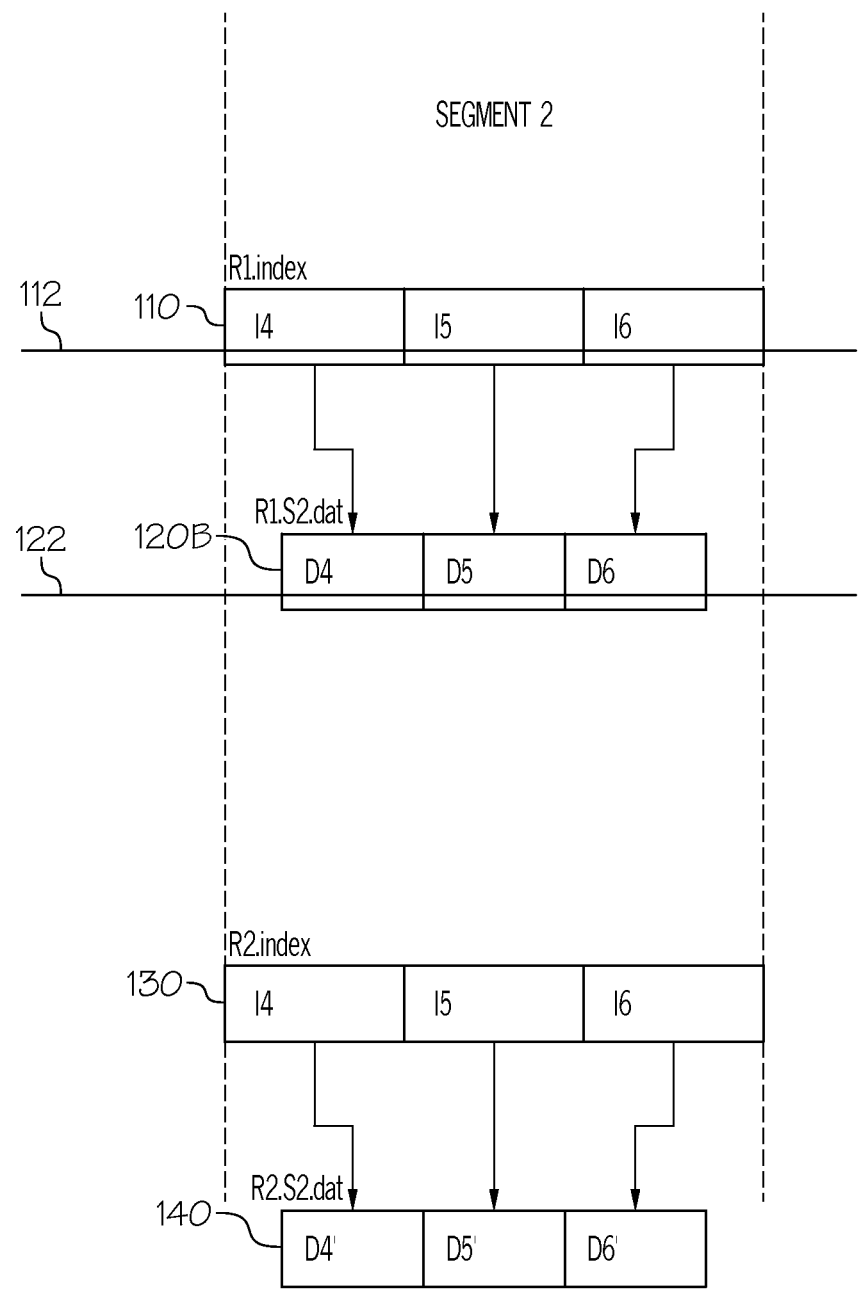
FIG. 4 is a block diagram illustrating a second data change type of a particular segment of a source volume and its associated index and data files.

FIG. 4 illustrates a second type of data change status. In this kind of data change in a segment, all data from recovery point 1 data segment file 120 are changed in the new recovery point 2 (130, 140). The segment data file 120 of the previous recovery point 1 is now obsolete. To execute a merge, the recovery point 1 index file 110 is deleted as indicated by line 112. Also, the recovery point 1 data segment file 120 is deleted as indicated by line 122. In this case, disk space is effectively freed up (because file 120 is deleted). However, it is noteworthy that disk read/write operations are not introduced.

More specifically, in FIG. 4, when an incremental backup is executed and the recovery point 2 is generated, the incremental backup reads out all data on logical volume 2 (segment 2) and writes the data from logical volume 2 the data file 140 of recovery point 2 (because all data have changed on logical volume 2). Before the merge job, both recovery point 1 and recovery point 2 were valid. That is, the index file 110 and data file 120 of recovery point 1 were valid and the index file 130 and data file 140 of recovery point 2 were valid. Before the merge job, these files could not be deleted because deletion would render these files not restorable. However, after the merge job, recovery point 1 is not retained any longer because after the merge job it is not valid, and only recovery point 2 needs to be retained. As illustrated in FIG. 4, all the data of recovery point 2 are located at the data file 140 of recovery point 2. This means that all data in the data file 120 of recovery point 1 are invalid. So, at this time, both the index file 110 and the data file 120 of recovery point 1 can be deleted. This deletion of recovery point 1 index file 110 and recovery point 1 data file 120 can be executed very quickly.

Figure 5:
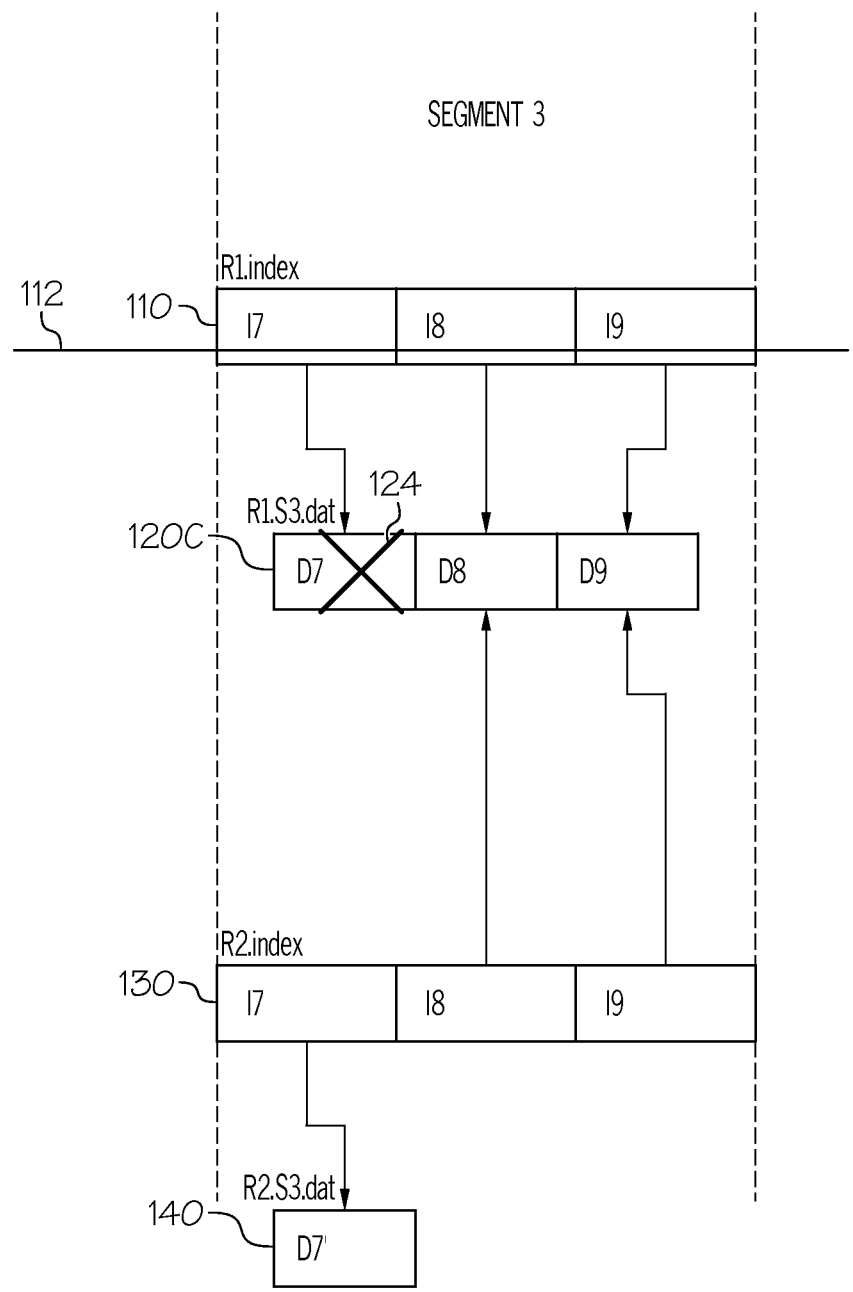
FIG. 5 is a block diagram illustrating a third data change type of a particular segment of a source volume and its associated index and data files.

FIG. 5 illustrates a third type of data change status. In this kind of segment, part of the data is changed in the new recovery point (recovery point 2 (130) in FIG. 5). This means that there is still valid data (D8, D9) in the segment data file 120 of the previous recovery point 1 (120). To do a merge, the recovery point 1 index file 110 is deleted as indicated by line 112. The segment data file 120 is handled as follows. The segment recovery point 1 data file 120 has only one obsolete data block D7 as indicated by 124. Since there are a total of three data blocks in this segment—D7, D8, and D9—the percentage of obsolete data blocks in the recovery point 1 data file 120 is 33.3%. If data block D7' is read from the recovery point 2 segment data file 140, and D8/D9 are read from recover point 1 segment data file 120, this results in the writing of one new data file 140. This results in reading three blocks and writing three blocks. However, it results in the freeing up of only one block (D7 in file 120). So this is not cost effective.

More specifically, when an incremental backup generates recovery point 2 in FIG. 5, the incremental backup reads out the changed data on the logical volume and writes the changed data to the data file 140 of recovery point 2. As noted in the previous paragraph, before the merge job, both recovery point 1 and recovery point 2 are valid, that is, the index file 110 and data file 120 of recovery point 1, and the index file 130 and data file 140 of recovery point 2 are valid. Before the merge, these files cannot be deleted because recovery point 1 or recovery point 2 would not then be restorable. After the merge job however, recovery point 1 is not retained any longer because it has expired, and is not valid. The system needs to retain recovery point 2. From FIG. 5, it can be seen that for this logical volume, the index files 110, 130 of the recovery points are pointing to both the data file 120 of recovery point 1 and the data file 140 of recovery point 2. This means that both data files 120, 140 contain valid data. Consequently, at this time, the index file 110 of recovery point 1 can be deleted, but the data file 120 of recovery point 1 cannot be deleted. In order to delete the data file 120 of recovery point 1, the valid data D8, D9 of the data file 120 need to be read and then written to a new location. Then, the data file 120 of recovery point 1 could be deleted. However, such a process is time consuming. To avoid this, the concept of a delayed merge is introduced, wherein the system delays until a later time when the percentage of valid data in data file 120 of recovery point 1 is much less.

In a delayed merge, no data are moved in a particular round of a merge. The system waits for a later merge session, after which, in all likelihood, there will be more obsolete data blocks in the particular segment data file at issue. Once the condition to trigger data movement is hit, real data movement is executed in order to free up disk space. For example, the condition to trigger data movement might be that the percentage of obsolete data blocks is more than 50%. After some time, recovery point 2 will expire just like recovery point 1 expired. At this time, recovery point 1 segment data file 120 might have more obsolete data blocks (for example, in FIG. 6, D8 as indicated by 126), and this may trigger real data movement to free disk space.

Figure 6:
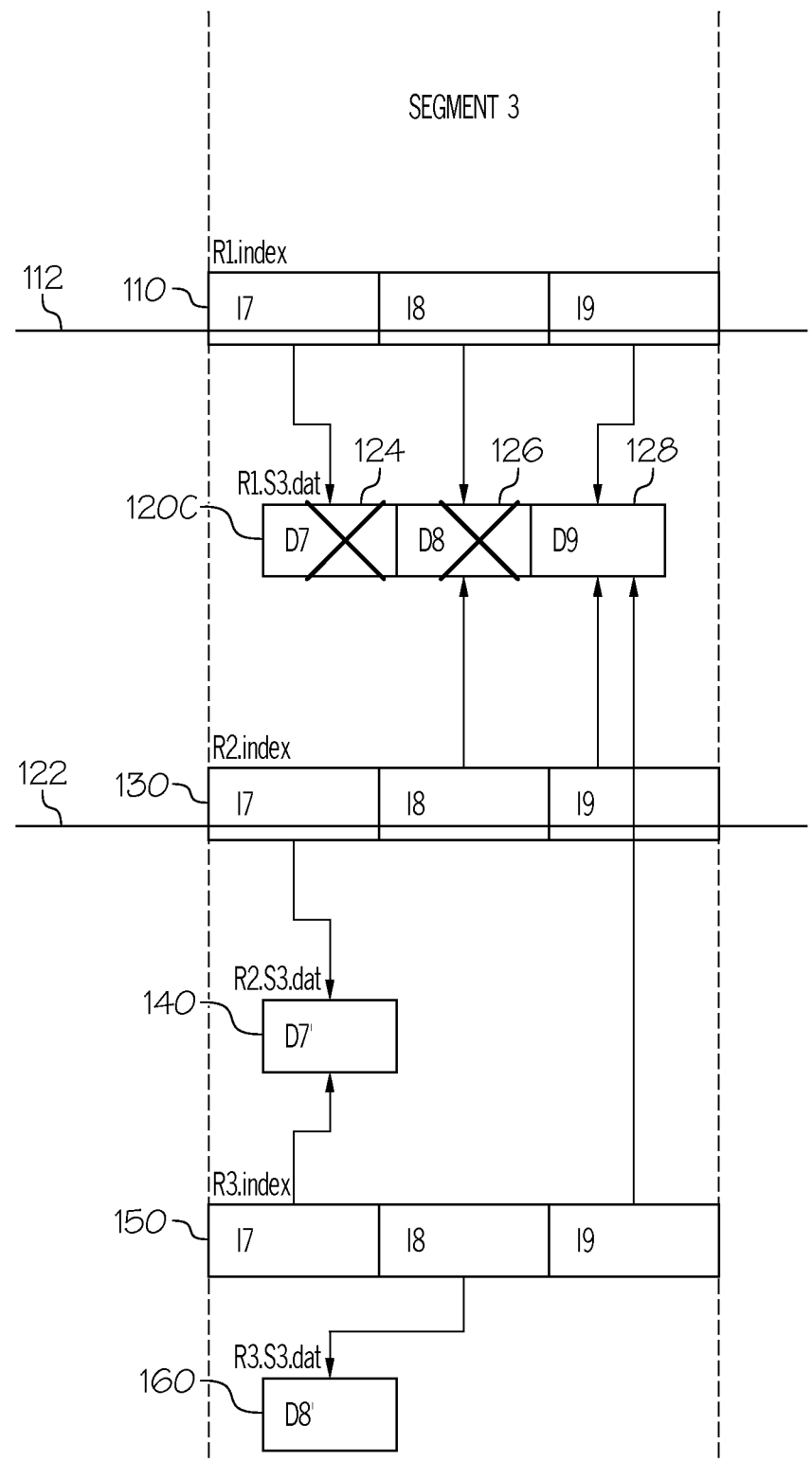
FIG. 6 is a block diagram illustrating the third data change type of a particular segment of a source volume and its associated index and data files.

Referring now to FIG. 6, both recovery point 1 and recovery point 2 have expired, as indicated by lines 112 and 122. The index entries of recovery point 3 index file 150 point to D7'(140), D8' (160) and D9 (128). Consequently, the recovery point 1 segment data file 120 has two obsolete data blocks (D7 and D8). The percentage of obsolete data blocks in recovery point 1 data file 120 is now 66.7%. Since the percentage of obsolete data blocks is greater than 50%, real data movement is triggered to free up disk space. It is noteworthy that the 50% threshold is just an example, and other thresholds can be chosen by the system operator or other user.

Figure 7A:
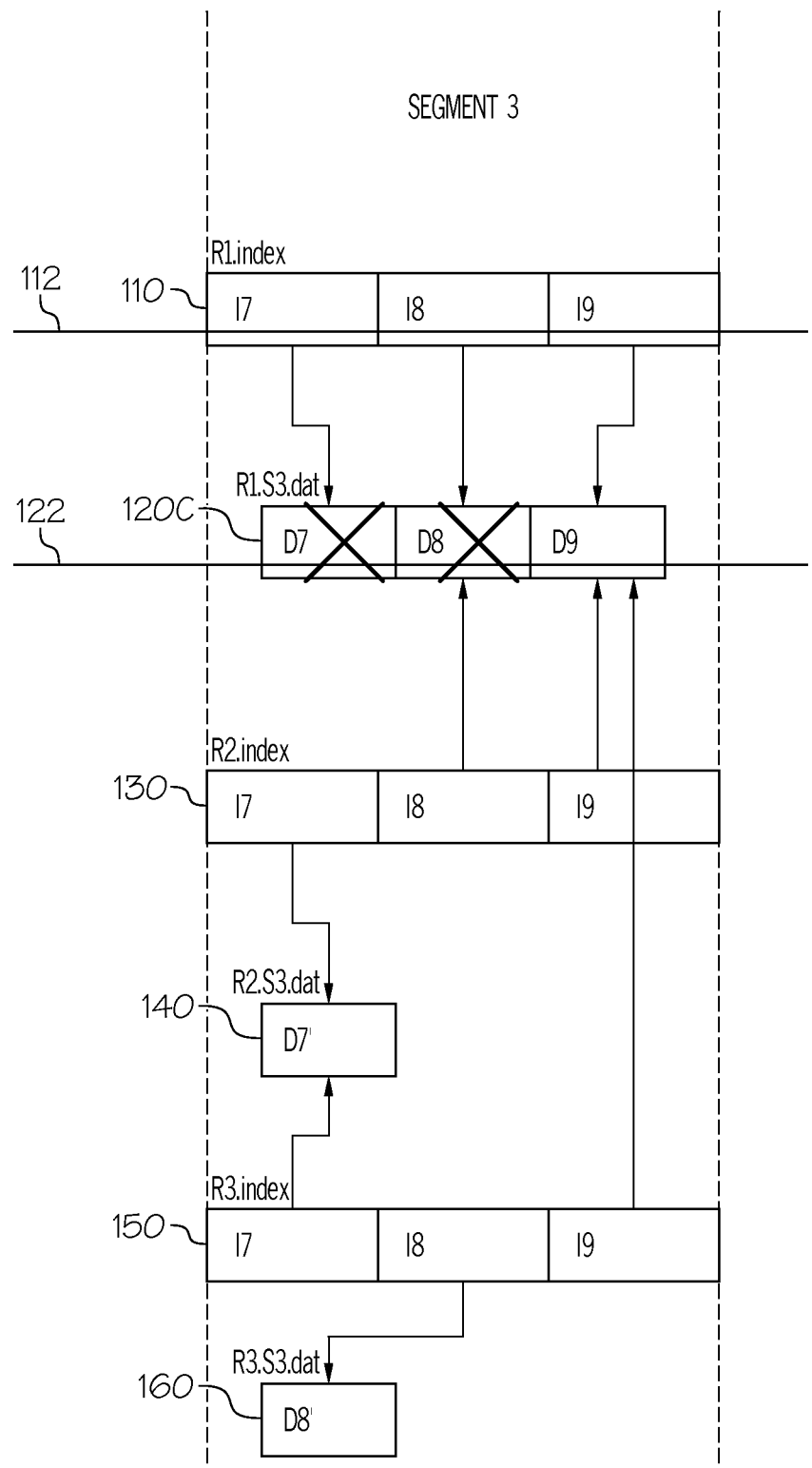
FIGS. 7A and 7B are block diagrams illustrating another particular segment of a source volume and its associated index and data files.
Figure 7B:
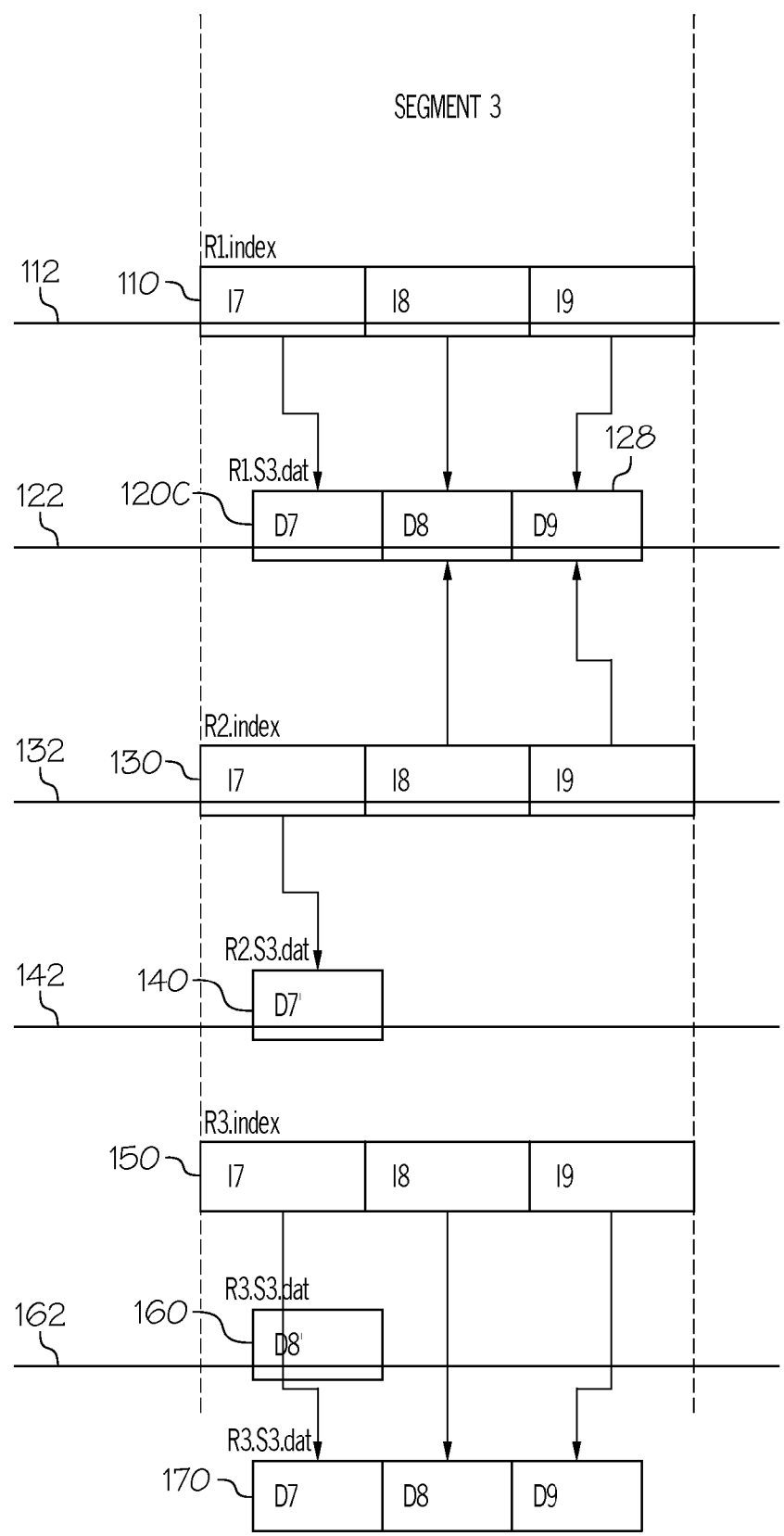

FIGS. 7A and 7B illustrate the details of this third type of data change status. Specifically, FIG. 7A illustrates that the recovery point 1 data file 120 has surpassed the selected threshold of 50% of obsolete blocks (D7 and D8). Then, in FIG. 7B, data is moved from D7' (140), D8' (160), and D9 (128) to a temporary segment file, which is later renamed to recovery point 3 data segment file (170). That is, the data file for this logical volume or segment is rebuilt to free up disk space, and the recovery point 3 index file 150 points to the rebuilt data file 170. After the execution of this data movement, recovery point 1 index file 110, recovery point 1 data file 120, recovery point 2 index file 130, recovery point 2 data segment file 140, and recovery point 3 data segment file 160 are deleted as indicated by 112, 122, 132, 142, and 162. Once again, as noted above, what is changing is the data blocks on the logical volume. The data blocks in the data file of the recovery points never change. Also, data blocks in the data file of a recovery point might be obsolete because the recovery points are expired (i.e., merged).

In summary, there are two ways to handle data for third type of data change status. In the first way, before the threshold to trigger data movement is met, the system simply deletes the index information of the previous recovery point and marks and/or records the obsolete data blocks in the segment data file (FIG. 5). This delayed merging results in the fact that obsolete data blocks will occupy disk space for a period of time. However, this is acceptable since the source volume has been divided into multiple segments. In a practical real world environment, it would be rare that all segments have delayed merging, i.e., obsolete data blocks, at the same time. This is one of the benefits of dividing the source volume into multiple segments.

In the second way to handle data for the third type of data change status, once the threshold to trigger data movement is met (e.g., greater than 50% obsolete data blocks in a segment), valid data blocks are read from one or more segment data files, one or more new segment data files (for one or more multiple segments) are written, and then all previous segment data files wherein the data movement was triggered are deleted. In this case, the system of course updates the index information of the new recovery point to link to the new data location in the new data segment files. This process is cost-effective since the percentage of obsolete data blocks is not insubstantial (e.g., at least greater than 50%) in this case.

In summary, a merge deletes the index file of a recovery point that has expired, and points the indices of the appropriate remaining index files to the appropriate data files. A data rebuild reads out the remaining data blocks from a segment data file, and combines these valid data blocks from the other recovery point data files in that segment to form or rebuild the data file of that segment. The delayed data rebuilding, which also can be referred to as a delayed merge, rebuilds and then deletes a recovery point data file in a particular segment when the number of invalid blocks in that recovery point data file in that particular segment surpasses a threshold.

As can be seen from the above, an embodiment involves a complete system that supports quick merging on recovery points. The source volume is divided into multiple segments. As the source volume is divided into multiple segments, it is quite likely that some segments will not have any new or changed data in an incremental backup (FIG. 3). If this is indeed the case, the merge will be extremely quick. Also, it is quite likely that all data of some segments will be fully changed in an incremental backup (FIG. 4). If this is indeed the case, the merge will be extremely quick. Otherwise, delayed merging is implemented (FIGS. 5-7B). That is, if the percentage of obsolete data blocks is small in a specific segment, this segment is skipped in the current merge job. Later on, more recovery points will expire, and at that time, the percentage of obsolete data blocks will have in all likelihood increased. The data is then moved to rebuild this segment data file. Once again, in a practical real world situation, it unlikely that all segments will have delayed-merging of obsolete data blocks at the same time. This means that delayed merging won't occupy too much extra disk space to hold obsolete data blocks.

Figure 8A:
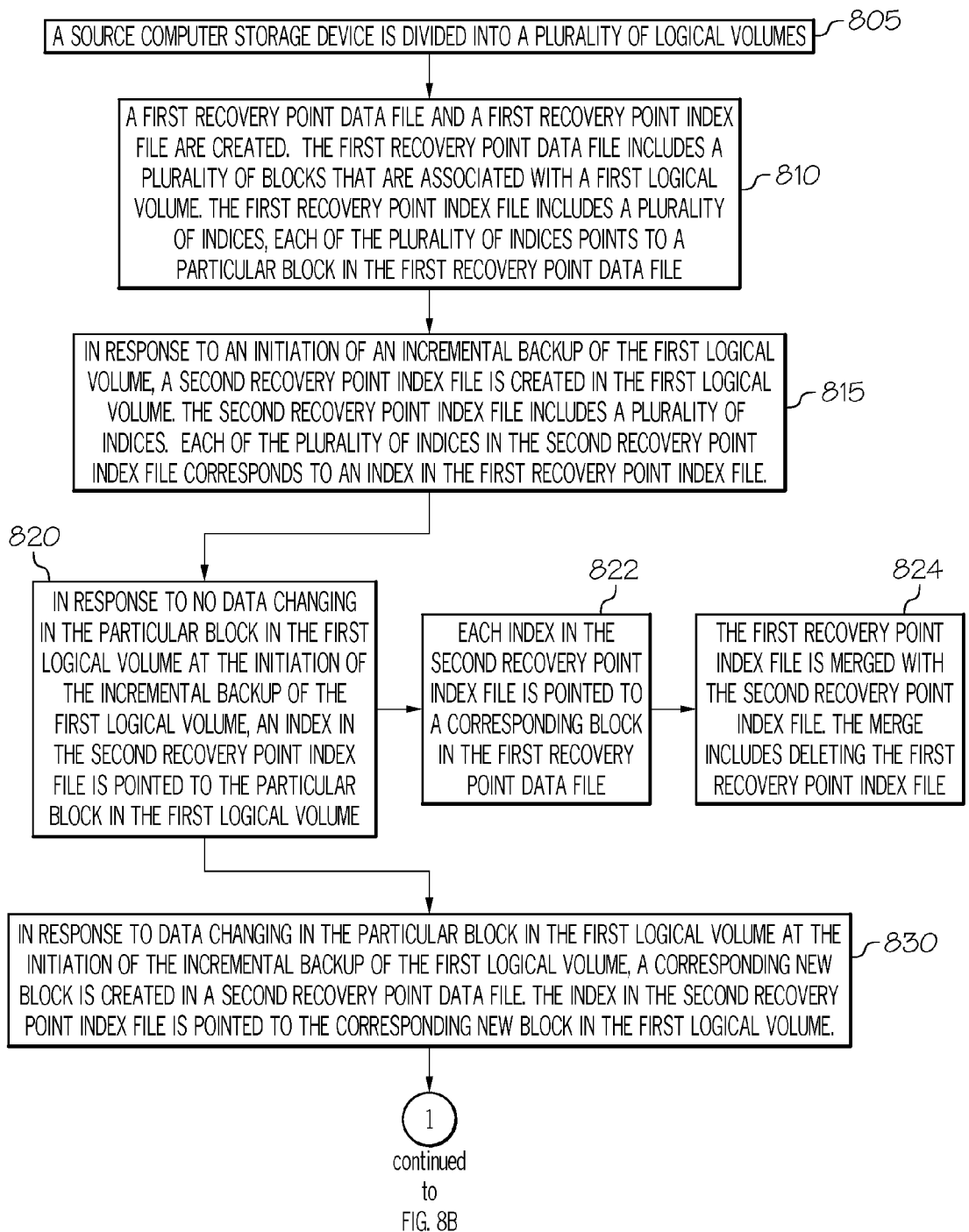
FIGS. 8A, 8B, and 8C are a block diagram illustrating operations and features of a system and method for merging continuous volume snapshots in a computer system.
Figure 8B:
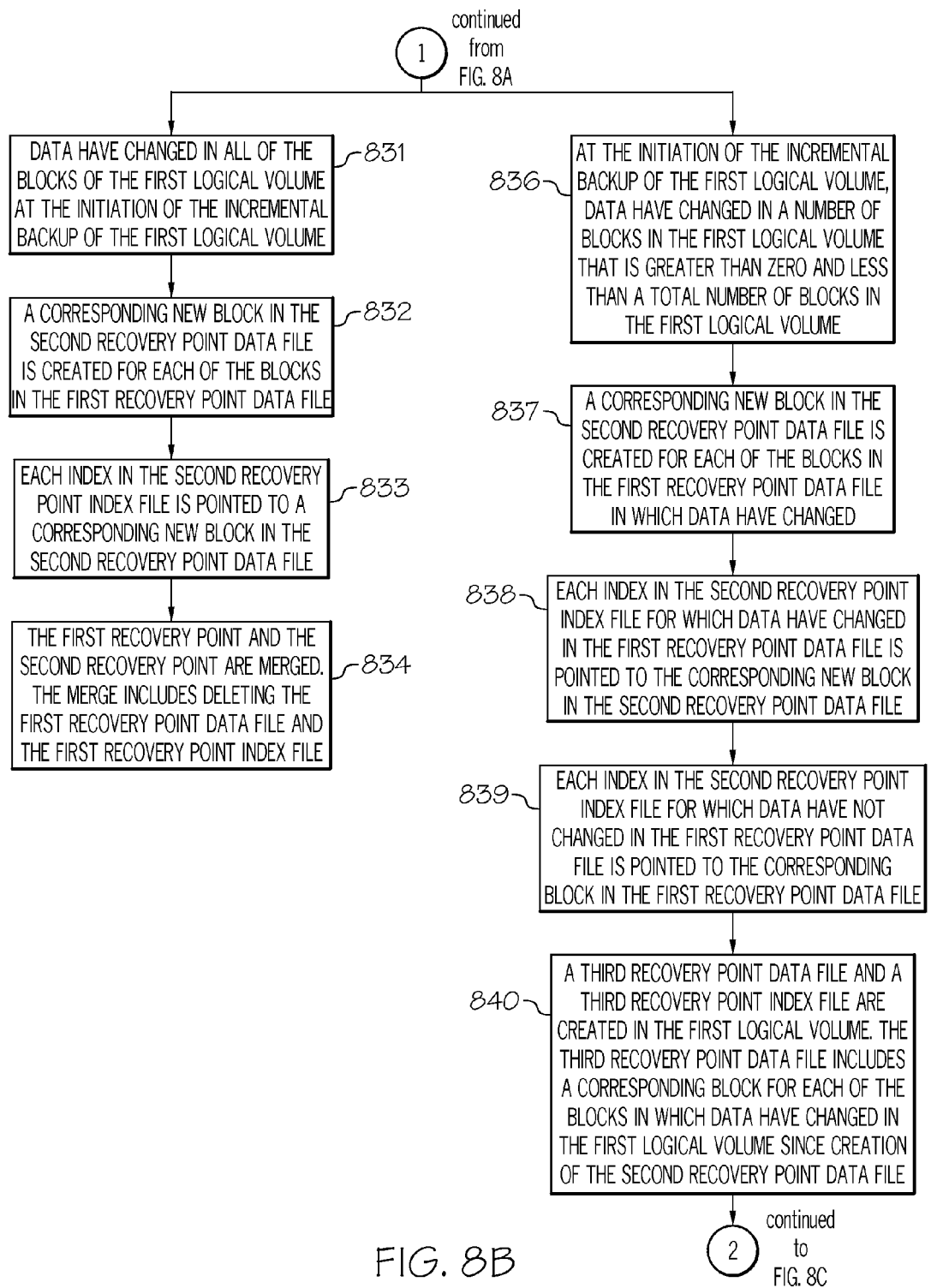
Figure 8C:
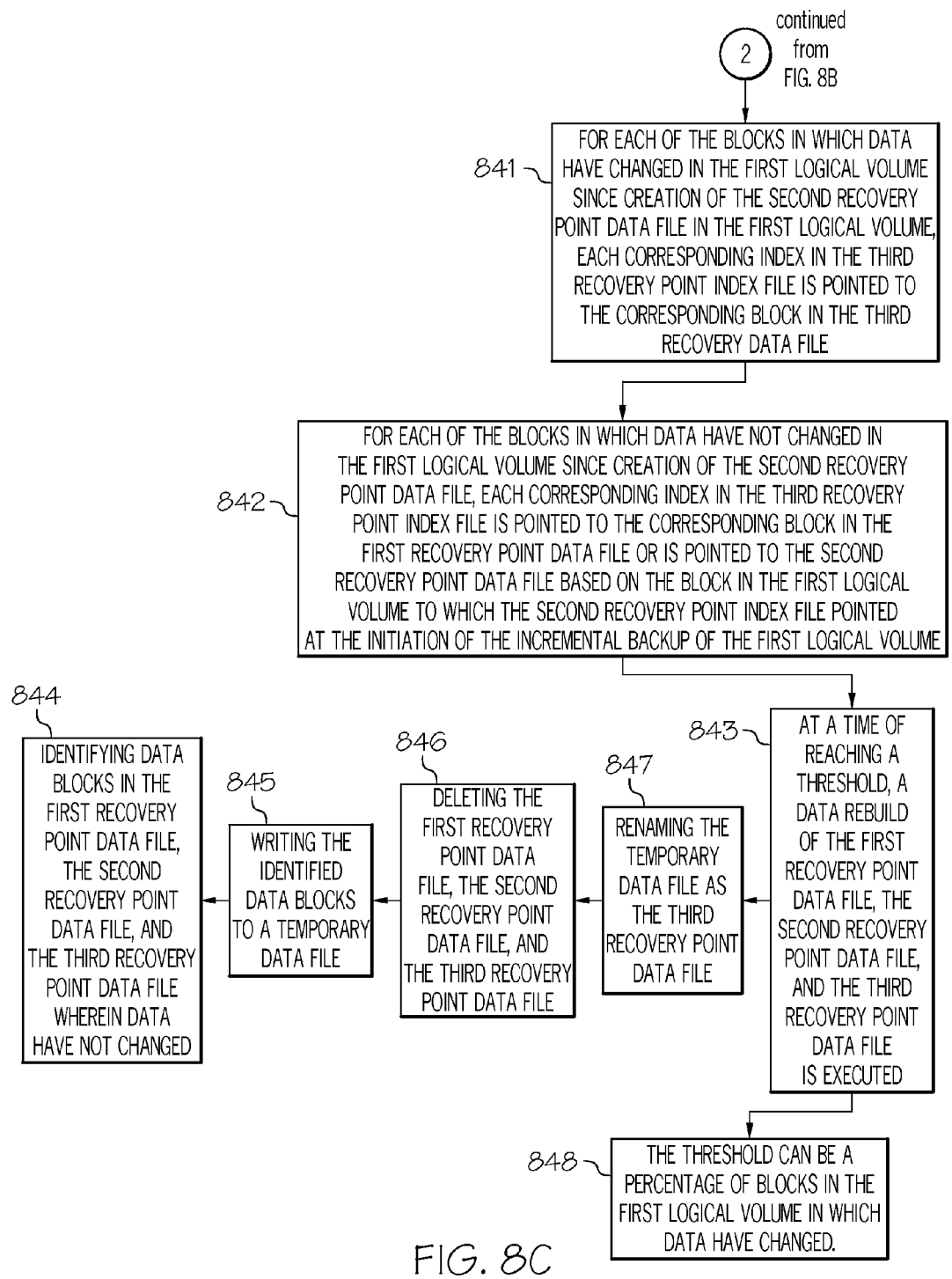

FIGS. 8A, 8B, and 8C are a block diagram illustrating operations and features of a system for incremental backups of a computer system. FIGS. 8A, 8B, and 8C include a number of operation and/or feature blocks 805-848. Though arranged serially in the example of FIGS. 8A, 8B, and 8*c*, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIGS. 8A, 8B, and 8C, at 805, a source computer storage device is divided into a plurality of logical volumes. At 810, a first recovery point data file and a first recovery point index file are created. The first recovery point data file includes a plurality of blocks that are associated with a first logical volume (i.e., one of the plurality of logical volumes that were created for the source computer storage device). The first recovery point index file includes a plurality of indices. Each of the plurality of indices points to a particular block in the first recovery point data file in the first logical volume.

At 815, in response to an initiation of an incremental backup of the first logical volume, a second recovery point index file is created in the first logical volume. This second recovery point index file includes a plurality of indices, and each of the plurality of indices in the second recovery point index file in the first logical volume corresponds to an index in the first recovery point index file in the first logical volume.

At 820, in response to no data changing in the particular block in the first logical volume at the initiation of the incremental backup of the first logical volume, an index in the second recovery point index file in the first logical volume is pointed to the particular block in the first logical volume. At 822, each index in the second recovery point index file is pointed to a corresponding block in the first recovery point data file in the first logical volume. At 824, the first recovery point index file is merged with the second recovery point index file, the merge including deleting the first recovery point index file.

At 830, in response to data changing in the particular block in the first logical volume at the initiation of the incremental backup of the first logical volume, a corresponding new block is created in a second recovery point data file. The corresponding new block in the second recovery point data file is associated with the first logical volume, and the index in the second recovery point index file is pointed to the corresponding new block in the first logical volume.

At 831, data have changed in all of the blocks of the first logical volume at the initiation of the incremental backup of the first logical volume, and the following operations are executed. First, at 832, a corresponding new block in the second recovery point data file in the first logical volume is created for each of the blocks in the first recovery point data file in the first logical volume. Second, at 833, each index in the second recovery point index file is pointed to a corresponding new block in the second recovery point data file in the first logical volume. Then, at 834, the first recovery point and the second recovery point are merged, the merge includes deleting the first recovery point data file and the first recovery point index file.

At 836, at the initiation of the incremental backup of the first logical volume, data have changed in a number of blocks in the first logical volume that is greater than zero and less than a total number of blocks in the first logical volume, and the following operations are executed. At 837, a corresponding new block in the second recovery point data file in the first logical volume is created for each of the blocks in the first recovery point data file in the first logical volume in which data have changed. At 838, each index in the second recovery point index file in the first logical volume for which data have changed in the first recovery point data file in the first logical volume is pointed to the corresponding new block in the second recovery point data file in the first logical volume. At 839, each index in the second recovery point index file in the first logical volume for which data have not changed in the first recovery point data file in the first logical volume is pointed to the corresponding block in the first recovery point data file in the first logical volume.

At 840, a third recovery point data file and a third recovery point index file are created in the first logical volume. The third recovery point data file includes a corresponding block for each of the blocks in which data have changed in the first logical volume since creation of the second recovery point data file. At 841, for each of the blocks in which data have changed in the first logical volume since creation of the second recovery point data file in the first logical volume, each corresponding index in the third recovery point index file in the first logical volume is pointed to the corresponding block in the third recovery data file in the first logical volume. At 842, for each of the blocks in which data have not changed in the first logical volume since creation of the second recovery point data file in the first logical volume, each corresponding index in the third recovery point index file is pointed to the corresponding block in the first recovery point data file in the first logical volume or is pointed to the second recovery point data file in the first logical volume based on the block in the first logical volume to which the second recovery point index file pointed at the initiation of the incremental backup of the first logical volume. At 843, at a time of reaching a threshold, a data rebuild of the first recovery point data file, the second recovery point data file, and the third recovery point data file is executed. In some instances however, it is possible that the threshold is not met when the first recovery point, the second recovery point, and the third recovery point are merged. In such a case, the system has to wait for additional expired recovery points to merge. For example, if the threshold is not met at the expiration of recovery points 1, 2, and 3, then the recovery points are merged upon the expiration of recovery point 4 (or some later recovery point when the threshold is finally met). The data rebuild includes identifying data blocks in the first recovery point data file, the second recovery point data file, and the third recovery point data file wherein data have not changed (844), writing the identified data blocks to a temporary data file (845), deleting the first recovery point data file, the second recovery point data file, and the third recovery point data file (846), and renaming the temporary data file as the third recovery point data file (847). The threshold can be a percentage of blocks in the first logical volume in which data have changed (848).

Figure 9:
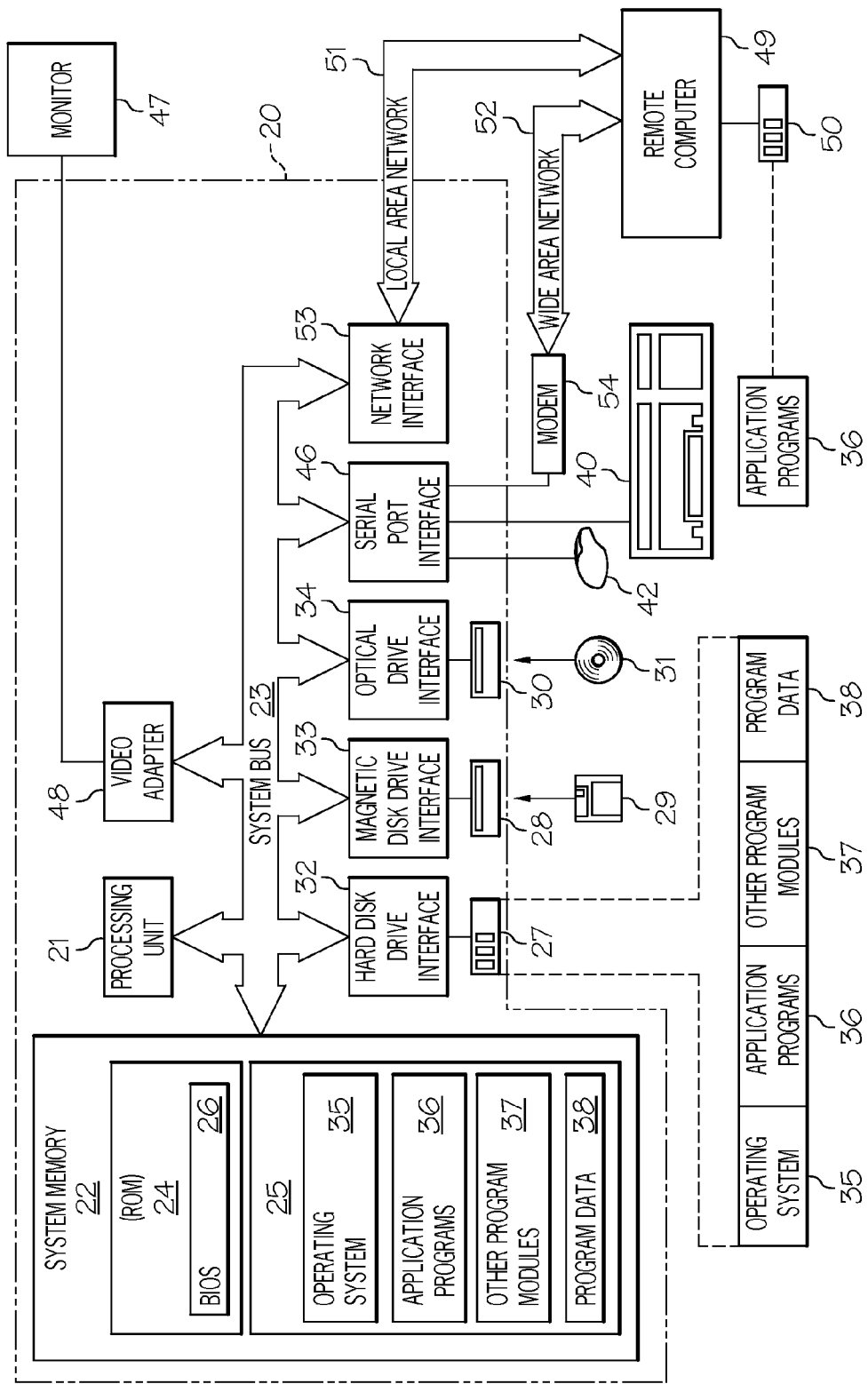
FIG. 9 is a block diagram illustrating an example of a computer system upon which one or more of the embodiments of this disclosure can execute.

FIG. 9 is an overview diagram of hardware and an operating environment in conjunction with which embodiments may be practiced. The description of FIG. 9 is intended to provide a brief, general description of suitable computer hardware and a suitable computing environment in conjunction with which the embodiments may be implemented. Some embodiments are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the embodiments may be practiced with other computer system configurations, including hand-held devices, multiprocessor systems, microprocessor-based or programmable consumer electronics, network PCS, minicomputers, mainframe computers, and the like. Embodiments may also be practiced in distributed computer environments where tasks are performed by I/0 remote processing devices that are linked through a communications network. In a distributed computing environment, program modules may be located in both local and remote memory storage devices.

In the embodiment shown in FIG. 9, a hardware and operating environment is provided that is applicable to any of the servers and/or remote clients shown in the other Figures.

As shown in FIG. 9, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for one or more embodiments can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the disclosed embodiments are not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 9 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for merging continuous volume snapshots have been described. Although specific example embodiments have been described, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A system comprising:
   a computer processor operable to execute an incremental backup and merge of recovery points by:
      creating a first recovery point data file and a first recovery point index file;
   wherein the first recovery point data file comprises a plurality of blocks that are associated with a first logical volume; and
   wherein the first recovery point index file comprises a plurality of indices that each that each points to respective blocks in the first recovery point data file;
      in response to an initiation of an incremental backup of the first logical volume, creating a second recovery point index file in the first logical volume comprising a plurality of indices, wherein each of the plurality of indices in the second recovery point index file in corresponds to an index in the first recovery point index file;
      in response to no data changing in the first logical volume at the initiation of the incremental backup, pointing an index in the second recovery point index file in the first logical volume to a respective block in the first logical volume;
      in response to data changing in a number of blocks in the first logical volume at the initiation of the incremental backup, wherein the number of changed blocks is greater than zero and less than a total number of blocks in the first volume, creating a corresponding new block in a second recovery point data file for each of the blocks in the first recovery point data file in which data have changed;
      pointing each index in the second recovery point index file for which data have changed in the first recovery point data file to the corresponding new block in the second recovery point data file; and
      pointing each index in the second recovery point index file for which data have not changed in the first recovery point data file to the corresponding block in the first recovery point data file; and
      in response to the initiation of the incremental backup, creating in the first logical volume a third recovery point data file and creating a third recovery point index file, wherein the third recovery point data file comprises a corresponding block for each of the blocks in which data have changed in the first logical volume since creation of the second recovery point data file;
      for each of the blocks in which data have changed in the first logical volume since creation of the second recovery point data file, pointing each corresponding index in the third recovery point index file to the corresponding block in the third recovery data file;
      and for each of the blocks in which data have not changed in the first logical volume since creation of the second recovery point data file, pointing each corresponding index in the third recovery point index file to the corresponding block in the first recovery point data file or the second recovery point data file based on the block in the first logical volume to which the second recovery point index file pointed at the initiation of the incremental backup of the first logical volume.

2. The system of claim 1, wherein when no data have changed in any of the blocks of the first logical volume at the initiation of the incremental backup, the computer processor further points each index in the second recovery point index file to a corresponding block in the first recovery point data file.

3. The system of claim 2, wherein the computer processor further executes a merge job including deleting the first recovery point index file.

4. The system of claim 1, wherein when data have changed in all of the blocks of the first logical volume at the initiation of the incremental backup, the computer processor further:
 creating a corresponding new block in the second recovery point data file for each of the blocks in the first recovery point data file; and
 pointing each index in the second recovery point index file to a corresponding new block in the second recovery point data file.

5. The system of claim 4, comprising the computer processor further executing a merge job including deleting the first recovery point data file and deleting the first recovery point index file.

6. The system of claim 1, wherein at a time of reaching a threshold, the computer processor is configured to execute a data rebuild of the first recovery point data file, the second recovery point data file, and the third recovery point data file, the data rebuild comprising:
 identifying data blocks in the first recovery point data file, the second recovery point data file, and the third recovery point data file wherein data have not changed;
 writing the identified data blocks to a temporary data file;
 deleting the first recovery point data file, the second recovery point data file, and the third recovery point data file; and
 renaming the temporary data file as the third recovery point data file.

7. The system of claim 6, wherein the threshold comprises a percentage of blocks in the first logical volume in which data have changed.

8. A method comprising:
 creating a first recovery point data file and a first recovery point index file;
wherein the first recovery point data file comprises a plurality of blocks that are associated with a first logical volume; and
wherein the first recovery point index file comprises a plurality of indices that each that each points to respective blocks in the first recovery point data file;
 in response to an initiation of an incremental backup of the first logical volume, creating a second recovery point index file in the first logical volume comprising a plurality of indices, wherein each of the plurality of indices in the second recovery point index file in corresponds to an index in the first recovery point index file;
 in response to no data changing in the first logical volume at the initiation of the incremental backup, pointing an index in the second recovery point index file in the first logical volume to a respective block in the first logical volume;
 in response to data changing in a number of blocks in the first logical volume at the initiation of the incremental backup, wherein the number of changed blocks is greater than zero and less than a total number of blocks in the first volume, creating a corresponding new block in a second recovery point data file for each of the blocks in the first recovery point data file in which data have changed;
 pointing each index in the second recovery point index file for which data have changed in the first recovery point data file to the corresponding new block in the second recovery point data file; and
 pointing each index in the second recovery point index file for which data have not changed in the first recovery point data file to the corresponding block in the first recovery point data file; and
 in response to the initiation of the incremental backup, creating in the first logical volume a third recovery point data file and creating a third recovery point index file, wherein the third recovery point data file comprises a corresponding block for each of the blocks in which data have changed in the first logical volume since creation of the second recovery point data file;
 for each of the blocks in which data have changed in the first logical volume since creation of the second recovery point data file, pointing each corresponding index in the third recovery point index file to the corresponding block in the third recovery data file;
 and for each of the blocks in which data have not changed in the first logical volume since creation of the second recovery point data file, pointing each corresponding index in the third recovery point index file to the corresponding block in the first recovery point data file or the second recovery point data file based on the block in the first logical volume to which the second recovery point index file pointed at the initiation of the incremental backup of the first logical volume.

9. The method of claim 8, wherein when no data have changed in any of the blocks of the first logical volume at the initiation of the incremental backup, the method further comprises:
 pointing each index in the second recovery point index file to a corresponding block in the first recovery point data file; and
 executing a merge job including deleting the first recovery point index file.

10. The method of claim 8, wherein when data have changed in all of the blocks of the first logical volume at the initiation of the incremental backup,
 creating a corresponding new block in the second recovery point data file for each of the blocks in the first recovery point data file;
 pointing each index in the second recovery point index file to a corresponding new block in the second recovery point data file; and
 executing a merge job including deleting the first recovery point data file and deleting the first recovery point index file.

11. The method of claim 8, wherein at a time of reaching a threshold, comprising executing a data rebuild of the first recovery point data file, the second recovery point data file, and the third recovery point data file, the data rebuild comprising:
 identifying data blocks in the first recovery point data file, the second recovery point data file, and the third recovery point data file wherein data have not changed;
 writing the identified data blocks to a temporary data file;

deleting the first recovery point data file, the second recovery point data file, and the third recovery point data file; and renaming the temporary data file as the third recovery point data file;

wherein the threshold comprises a percentage of blocks in the first logical volume in which data have changed.

12. A non-transitory computer readable medium comprising instructions that when executed by a processor execute a process comprising:

creating a first recovery point data file and a first recovery point index file;

wherein the first recovery point data file comprises a plurality of blocks that are associated with a first logical volume; and wherein the first recovery point index file comprises a plurality of indices that each that each points to respective blocks in the first recovery point data file;

in response to an initiation of an incremental backup of the first logical volume, creating a second recovery point index file in the first logical volume comprising a plurality of indices, wherein each of the plurality of indices in the second recovery point index file in corresponds to an index in the first recovery point index file;

in response to no data changing in the first logical volume at the initiation of the incremental backup, pointing an index in the second recovery point index file in the first logical volume to a respective block in the first logical volume;

in response to data changing in a number of blocks in the first logical volume at the initiation of the incremental backup, wherein the number of changed blocks is greater than zero and less than a total number of blocks in the first volume, creating a corresponding new block in a second recovery point data file for each of the blocks in the first recovery point data file in which data have changed;

pointing each index in the second recovery point index file for which data have changed in the first recovery point data file to the corresponding new block in the second recovery point data file; and pointing each index in the second recovery point index file for which data have not changed in the first recovery point data file to the corresponding block in the first recovery point data file; and in response to the initiation of the incremental backup, creating in the first logical volume a third recovery point data file and creating a third recovery point index file, wherein the third recovery point data file comprises a corresponding block for each of the blocks in which data have changed in the first logical volume since creation of the second recovery point data file;

for each of the blocks in which data have changed in the first logical volume since creation of the second recovery point data file, pointing each corresponding index in the third recovery point index file to the corresponding block in the third recovery data file;

and for each of the blocks in which data have not changed in the first logical volume since creation of the second recovery point data file, pointing each corresponding index in the third recovery point index file to the corresponding block in the first recovery point data file or the second recovery point data file based on the block in the first logical volume to which the second recovery point index file pointed at the initiation of the incremental backup of the first logical volume.

13. The non-transitory computer readable medium of claim 12, wherein when no data have changed in any of the blocks of the first logical volume at the initiation of the incremental backup, the process further comprises:

pointing each index in the second recovery point index file to a corresponding block in the first recovery point data file; and executing a merge job including deleting the first recovery point index file.

14. The non-transitory computer readable medium of claim 12, wherein when data have changed in all of the blocks of the first logical volume at the initiation of the incremental backup, the process further comprises:

creating a corresponding new block in the second recovery point data file for each of the blocks in the first recovery point data file;

pointing each index in the second recovery point index file to a corresponding new block in the second recovery point data file; and executing a merge job including deleting the first recovery point data file and deleting the first recovery point index file.

* * * * *